United States Patent
Wang et al.

(10) Patent No.: US 8,891,915 B2
(45) Date of Patent: Nov. 18, 2014

(54) OPTICAL SWITCH SYSTEM AND FEEDBACK CONTROL METHOD OF SIGNAL LIGHT

(71) Applicant: Huawei Technologies Co., Ltd., Shenzhen, Guangdong (CN)

(72) Inventors: Shijun Wang, Wuhan (CN); Yunsheng Wen, Shenzhen (CN); Jun Zhao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/972,107

(22) Filed: Aug. 21, 2013

(65) Prior Publication Data

US 2013/0336615 A1  Dec. 19, 2013

Related U.S. Application Data

(63) Continuation of application No. PCT/CN2012/071339, filed on Feb. 20, 2012.

(30) Foreign Application Priority Data

Feb. 21, 2011  (CN) .......................... 2011 1 0041439

(51) Int. Cl.
| | |
|---|---|
| *G02B 6/26* | (2006.01) |
| *G02B 6/35* | (2006.01) |
| *H04Q 11/00* | (2006.01) |
| *H04J 14/02* | (2006.01) |

(52) U.S. Cl.
CPC ............ *G02B 6/3586* (2013.01); *G02B 6/3548* (2013.01); *H04Q 2011/0041* (2013.01); *G02B 6/3518* (2013.01); *H04Q 11/0005* (2013.01); *H04J 14/0212* (2013.01); *G02B 6/3512* (2013.01); *H04Q 2011/0026* (2013.01); *H04Q 2011/003* (2013.01); *G02B 6/3588* (2013.01)
USPC .................. 385/18; 385/20; 385/15

(58) Field of Classification Search
CPC .. G02B 6/3512; G02B 6/3514; G02B 6/3516; G02B 6/3518; G02B 6/352; G02B 6/3546; G02B 6/3548; G02B 6/351; G02B 6/3604; H04Q 11/0001; H04Q 11/0005
USPC .................................... 385/18, 20, 25, 15, 16
See application file for complete search history.

(56) References Cited

U.S. PATENT DOCUMENTS

| | | | |
|---|---|---|---|
| 6,567,574 B1 | 5/2003 | Ma et al. | |
| 6,947,629 B2 * | 9/2005 | Chu et al. ........................ | 385/18 |

(Continued)

FOREIGN PATENT DOCUMENTS

| | | |
|---|---|---|
| CN | 1457200 | 11/2003 |
| CN | 1575429 | 2/2005 |

(Continued)

OTHER PUBLICATIONS

International Search Report, dated May 24, 2012, in corresponding International Application No. PCT/CN2012/071339 (6 pp.).

(Continued)

*Primary Examiner* — Ellen Kim
(74) *Attorney, Agent, or Firm* — Staas & Halsey LLP

(57) ABSTRACT

An optical switch system and the system includes a semi-transmissive semi-reflective module is configured to intercept, in a transmission manner, test light that is the same as the signal light with respect to the propagation path and output after being modulated by the optical output control module; the imaging module is configured to acquire the test light, generate corresponding initial optical path information and sampled optical path information in sequence, and transfer the initial optical path information and the sampled optical path information to the judging module in sequence; the judging module is configured to record the initial optical path information, and compare the sampled optical path information with the initial optical path information; and the control module is configured to control the optical output control module according to a comparison result.

8 Claims, 4 Drawing Sheets

(56) References Cited

U.S. PATENT DOCUMENTS

| | | | |
|---|---|---|---|
| 7,177,497 B2* | 2/2007 | Barrett | 385/24 |
| RE42,678 E * | 9/2011 | Wilde et al. | 385/24 |
| 2002/0131691 A1* | 9/2002 | Garrett et al. | 385/24 |
| 2003/0081887 A1* | 5/2003 | Karpinsky et al. | 385/22 |
| 2003/0190113 A1 | 10/2003 | Huang et al. | |
| 2004/0202407 A1* | 10/2004 | Hoke | 385/18 |
| 2005/0152638 A1 | 7/2005 | Barrett et al. | |
| 2006/0228072 A1* | 10/2006 | Davis et al. | 385/18 |
| 2008/0050064 A1 | 2/2008 | Sakai et al. | |
| 2010/0040325 A1 | 2/2010 | Tigli et al. | |
| 2010/0303407 A1* | 12/2010 | Sakai | 385/18 |
| 2011/0076009 A1* | 3/2011 | Sato et al. | 398/1 |
| 2014/0072302 A1* | 3/2014 | Iwama et al. | 398/48 |

FOREIGN PATENT DOCUMENTS

| | | |
|---|---|---|
| CN | 101002121 | 7/2007 |
| CN | 101216615 | 7/2008 |
| CN | 201673276 | 12/2010 |
| CN | 102135647 | 7/2011 |
| EP | 1 467 231 A2 | 10/2004 |
| WO | 01/93625 | 12/2001 |

OTHER PUBLICATIONS

PCT International Search Report and Written Opinion of the International Searching Authority issued May 24, 2012 in corresponding International Patent Application No. PCT/CN2012/071339.

European Search Report and Written Opinion issued on Jan. 27, 2014 in European Application No. 12749486.2-1504.

* cited by examiner

OPTICAL SWITCH SYSTEM AND FEEDBACK CONTROL METHOD OF SIGNAL LIGHT

CROSS-REFERENCE TO RELATED APPLICATIONS

This application is a continuation of International Application No. PCT/CN2012/071339, filed on Feb. 20, 2012, which claims priority to Chinese Patent Application No. 201110041439.5, filed on Feb. 21, 2011, both of which are hereby incorporated by reference in their entireties.

FIELD OF THE INVENTION

Embodiments of the present invention relate to optical-electronic technologies, and in particular, to an optical switch system and a feedback control method of signal light.

BACKGROUND OF THE INVENTION

With rapid development of a fiber to home (Fiber To Home, called FTTH for short below) technology which has a huge market scale, terminal users and optical link branches which are related to an access network are distributed complicatedly, the whole network adopts full fiber cabling, electrical signals cannot be utilized for monitoring, operation and maintenance, and therefore, an optical link detection system is required to perform the monitoring of the network maintenance, thereby ensuring network quality. In conventional monitoring systems, an optical time domain reflectometer (Optical Time Domain Reflectometer, called OTDR for short below) is mainly adopted to detect link performance, but the cost thereof is high, a 1*N optical switch is therefore adopted to reduce the use cost through N access terminals.

To guarantee stability of long-time working of the optical switch, a feedback mechanism is generally added into an optical switch system to ensure that the selection of the optical switch is consistent with parameters of factory setting, thereby guaranteeing that the optical performance of the optical switch does not change in any way after a certain period of working. In the prior art, the monitoring is carried out by adding a tap (Tap) and a photodetector (Photodetector, called PD for short below) at an output end. FIG. 1 shows a schematic structural diagram of a mechanical optical switch in the prior art, in which the Tap and the PD are set on both an input fiber and an output fiber, so as to detect whether optical power of a whole optical path satisfies a design requirement, and when an actual condition is inconsistent with the requirement, a feedback module instructs a control module to continuously adjust the optical path, so as to select an optimal optical path.

However, each branch of the optical switch system in the prior art needs a Tap and a PD, in which the cost is high, the design of the complete machine is complicated, the volume is large, and in particular, the foregoing problems are more serious for an optical switch with a large branching ratio.

SUMMARY OF THE INVENTION

Embodiments of the present invention provide an optical switch system and a feedback control method of signal light, achieving precise positioning of a whole optical path while reducing a cost and reducing the effect on optical performance caused by feedback control.

To achieve the foregoing purposes, an embodiment of the present invention provides an optical switch system, which includes an input fiber, an output fiber and an optical output control module; signal light is emitted out from the input fiber, modulated by the optical output control module and emitted into the output fiber, and the optical switch system further includes a semi-transmissive semi-reflective module, an imaging module, a judging module and a control module, where:

the semi-transmissive semi-reflective module is set in a signal light transmission path of the optical switch system, and configured to intercept, in a transmission manner, test light which is output after being modulated by the optical output control module and whose transmission path is the same as that of the signal light;

the imaging module is configured to acquire the test light, generate corresponding initial optical path information and sampled optical path information in sequence, and transfer the initial optical path information and the sampled optical path information to the judging module in sequence;

the judging module is configured to record the initial optical path information, compare the sampled optical path information generated by the imaging module with the initial optical path information, and output a comparison result to the control module; and the control module is configured to control the optical output control module according to the comparison result of the judging module.

An embodiment of the present invention provides a feedback control method of signal light. The method is applied to an optical switch system, the optical switch system includes an input fiber, an output fiber, an optical output control module, a semi-transmissive semi-reflective module, an imaging module, a judging module and a control module, and signal light is emitted out from the input fiber, modulated by the optical output control module and emitted into the output fiber, where the method includes:

intercepting, by the semi-transmissive semi-reflective module in a transmission manner, test light which is output after being modulated by the optical output control module and whose transmission path is the same as that of the signal light;

acquiring, by the imaging module, the test light, generating corresponding initial optical path information and sampled optical path information in sequence, and transferring the initial optical path information and the sampled optical path information to the judging module in sequence;

recording, by the judging module, the initial optical path information, comparing the sampled optical path information generated by the imaging module with the initial optical path information, and outputting a comparison result to the control module; and controlling, by the control module, the optical output control module according to the comparison result of the judging module.

With the optical switch system and the feedback control method of signal light provided by the embodiments of the present invention, the semi-transmissive semi-reflective module and the imaging module are set, the semi-transmissive semi-reflective module transmits a small part of signal light to the imaging module, so as to implement feedback control on the signal light output by the optical switch system, and the optical output control module of the optical switch system is adjusted and controlled according to a feedback result, to determine an optimal optical path of an optical switch. With the embodiments, precise positioning of the whole optical path in an optical switch can be implemented, and as comparing with the prior art, the cost is greatly reduced and the effect on the optical performance of the optical switch system caused by the feedback control is reduced.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

To make the objectives, technical solutions, and advantages of the embodiments of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
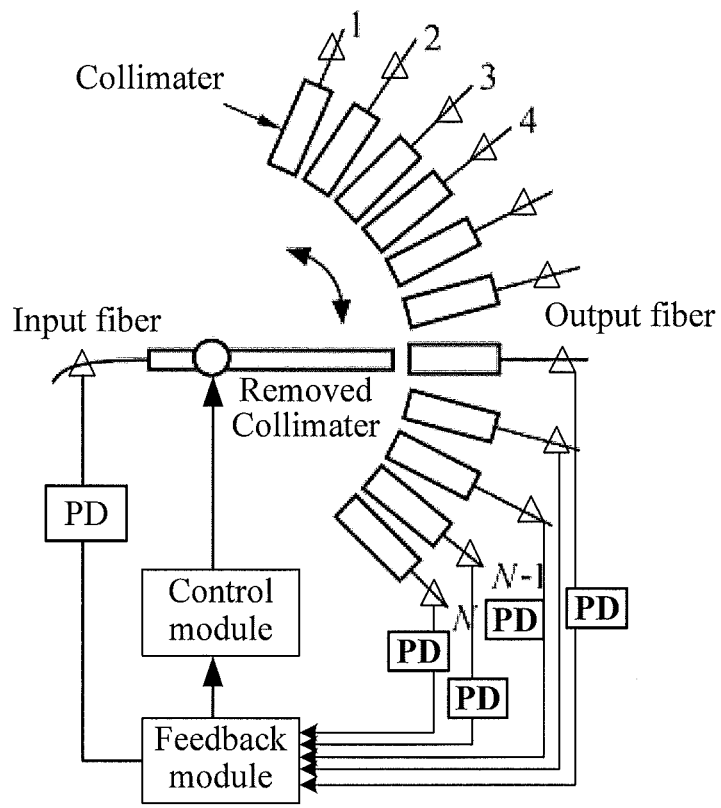
FIG. 1 is a schematic diagram of a feedback structure of a mechanical optical switch in the prior art.
Figure 2:
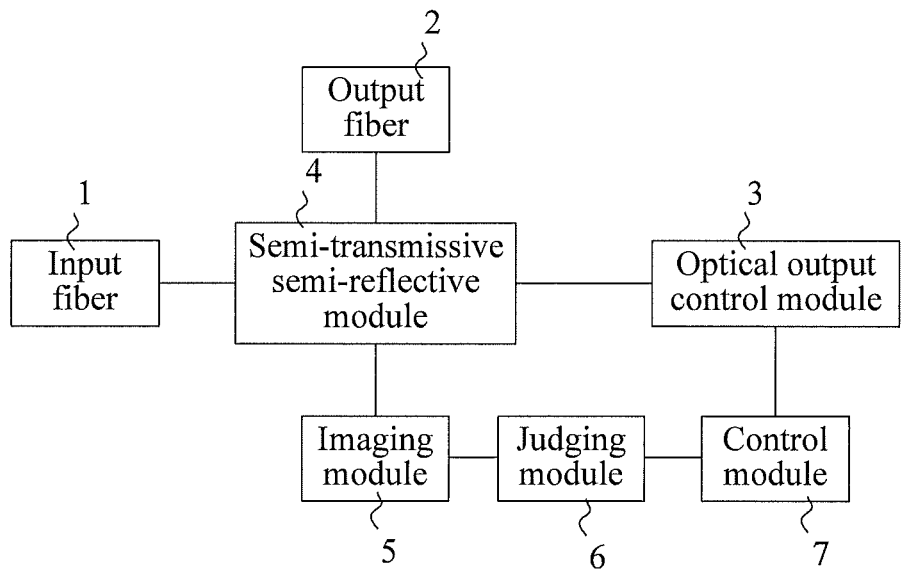
FIG. 2 is a schematic structural diagram of Embodiment 1 of an optical switch system of the present invention.

FIG. 2 is a schematic structural diagram of Embodiment 1 of an optical switch system of the present invention. As shown in FIG. 2, the embodiment provides an optical switch system, the optical switch system may specifically be applied to a micro electro mechanical systems (Micro Electro Mechanical Systems, called MEMS for short below) optical switch and specifically may include an input fiber 1, an output fiber 2 and an optical output control module 3, and signal light is emitted out from the input fiber 1, modulated by the optical output control module 3 and emitted into the output fiber 2. The optical switch system provided in the embodiment may further include a semi-transmissive semi-reflective module 4, an imaging module 5, a judging module 6 and a control module 7. The semi-transmissive semi-reflective module 4 is set in a signal light transmission path of the optical switch system, intercepts, in a transmission manner, test light which is output after being modulated by the optical output control module and whose transmission path is the same as that of the signal light, and is specifically configured to reflect the signal light output from the input fiber 1, where the reflected signal light is modulated by the optical output control module 3. The semi-transmissive semi-reflective module 4 reflects a part of the signal light to the output fiber 2, and allows the remaining signal light to be transmitted onto the imaging module 5 through the semi-transmissive semi-reflective module 4. Specifically, the semi-transmissive semi-reflective module 4 in the embodiment is at an optical input end of the input fiber 1, the signal light modulated by the optical output control module 3 is reflected to an optical input end of the output fiber 2 by the semi-transmissive semi-reflective module 4, and the signal light is reflected to the optical output control module 3 by the semi-transmissive semi-reflective module 4 after the signal light is output from the input fiber 1. In the embodiment, the signal light reflected by the semi-transmissive semi-reflective module 4 may be laser light used to test an optical path, or may be service light; when the signal light is the service light, only a small part of the service light is reflected, most of the service light is output to the output fiber 2, and a matching reflecting film is selected according to different wavelengths of the reflected signal light and the matching reflecting film is coated on the semi-transmissive semi-reflective module 4. The imaging module 5 is configured to acquire the test light, generate corresponding initial optical path information and sampled optical path information in sequence, and transfer the initial optical path information and the sampled optical path information to the judging module 6 in sequence. Besides, it should be noted that, the optical switch system in the embodiment may further include a storage module (not shown in the drawing) connected to the imaging module 5, and the storage module records the initial optical path information and the sampled optical path information of each branch. The imaging module 5 may be a charge-coupled device (Charge-coupled Device, called CCD for short below) or a complementary metal-oxide-semiconductor (Complementary Metal-Oxide-Semiconductor, called CMOS for short below). The judging module 6 is configured to record the initial optical path information, compare the sampled optical path information generated by the imaging module 5 with the initial optical path information, and send a comparison result to the control module 7. The control module 7 is configured to control the optical output control module 3 according to the comparison result, that is, when the comparison result is that an error between the sampled optical path information and the initial optical path information is not within a predetermined error range, control the optical output control module 3 to adjust an output reflection angle of the optical output control module 3 till the error between the sampled optical path information that is output after the adjustment and the initial optical path information falls within the predetermined error range.

In the embodiment, the input signal light enters the input fiber 1 first, the signal light output from the input fiber 1 arrives the semi-transmissive semi-reflective module 4, the semi-transmissive semi-reflective module 4 reflects the signal light to the optical output control module 3, output optical signal is generated after the control processing of the optical output control module 3, the output signal light is firstly reflected and transmitted by the semi-transmissive semi-reflective module, most of the light is reflected to the output fiber 2 and a small part of the light is transmitted to the imaging module 5; the imaging module 5 forms an image of the transmitted signal light, and generates sampled optical path information; the initial optical path information recorded by the storage module and the sampled optical path information are output to the judging module 6; the judging module 6 compares the initial optical path information with the sampled optical path information, and sends a comparison result to the control module 7; and the control module 7 controls the optical output control module 3 according to the comparison result, so as to determine an optimal optical path of an optical switch.

The embodiment provides an optical switch system, the semi-transmissive semi-reflective module and the imaging module are set, the semi-transmissive semi-reflective module transmits a small part of the signal light to the imaging module, so as to implement feedback control on the signal light output by the optical switch system, and the optical output control module of the optical switch system is adjusted and controlled according to a feedback result, to determine an optimal optical path of an optical switch. With the embodiment, precise positioning of the whole optical path in the optical switch can be implemented, and as compared with the prior art, a cost is greatly reduced and the effect on optical performance of the optical switch system caused by the feedback control is reduced.

Figure 3:
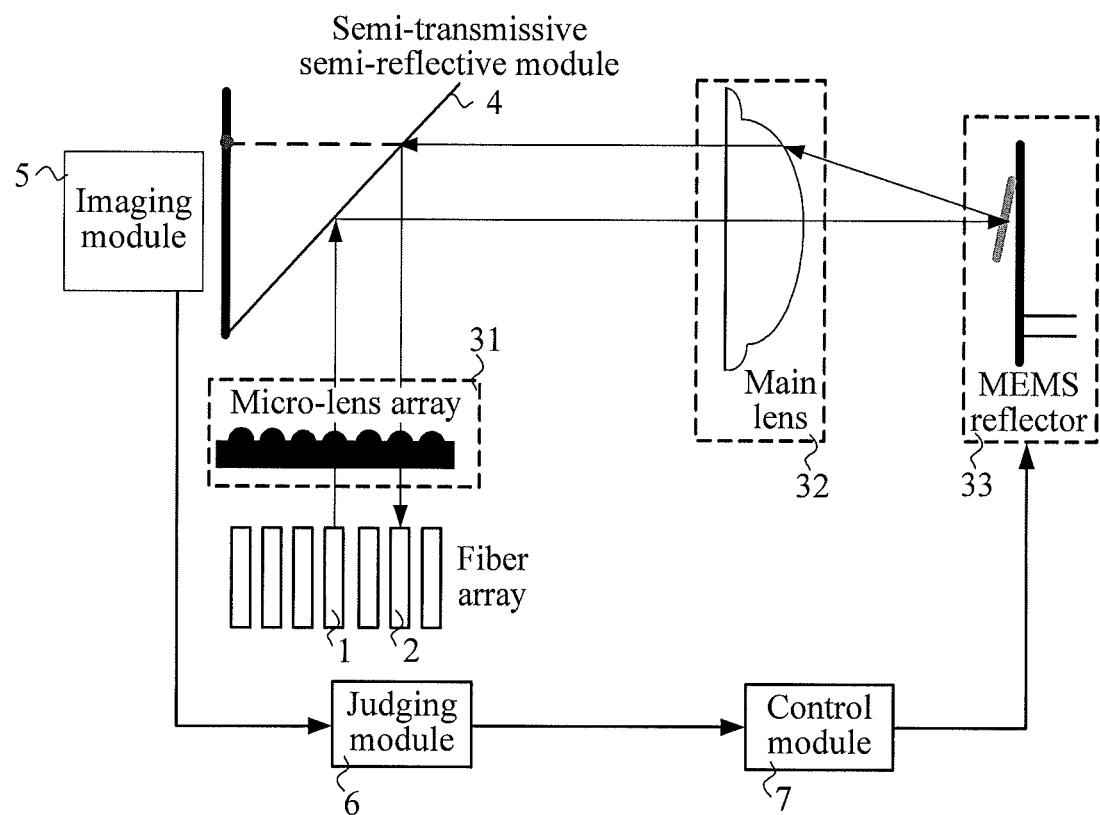
FIG. 3 is a schematic working principle diagram of an optical switch in Embodiment 2 of the optical switch system of the present invention.

FIG. 3 is a schematic working principle diagram of an optical switch in Embodiment 2 of an optical switch system of the present invention. As shown in FIG. 3, the optical switch system in the embodiment is specifically applied to an MEMS optical switch, which is a 1*N MEMS optical switch. In the embodiment, the optical output control module specifically includes a micro-lens array 31, a main lens 32 and a micro electro mechanical systems MEMS reflector 33, and a fiber array formed by an input fiber and output fibers. The input fiber and the output fibers in the embodiment are in arrayed arrangement, where an input fiber is at the middle of the array, and multiple output fibers are distributed at the periphery of the input fiber. The fiber array in the embodiment is a fiber group formed by arranging fibers according to a certain law and requirement, that is, a fiber group satisfying a certain spacing requirement. In FIG. 3, a fiber at the center of the fiber array is an input fiber, and the others are output fibers. The micro-lens array 31 is formed by multiple micro-lenses, a diameter of a micro-lens generally is less than 1 mm, and each micro-lens and an optical incident end face of each fiber are in one-to-one correspondence. Specifically, a fiber array and a lens array in the embodiment may be one-dimensional arrays, that is, the arrangement manner of a horizontal row or a vertical column, or may be two-dimensional arrays. When the fiber array and the lens array are two-dimensional arrays, correspondingly, in a three-dimensional space, the MEMS reflector changes in direction or rotates, to change a reflection path of the light. The main lens 32 is an ordinary optical lens, which may be a single lens or a lens group, or may be a spherical lens or an aspherical lens. The MEMS reflector 33 refers to an electronic chip which is manufactured by utilizing an MEMS technology and controls, through a voltage, a current or other parameters, a mirror surface on the chip to rotate.

When an optical switch works, an optical path at the very middle of the fiber array is an input end, an input signal light is emitted to the center of the MEMS reflector after passing through the micro-lens array and the main lens; the signal light then is output in a specific angle by controlling a rotation angle of the MEMS reflector, and after the output signal light is converted into collimated light by the main lens, the light is shaped and shrunk by utilizing the lens in the micro-lens array, and finally enters the fiber of a specific output end, thereby achieving the selection of an optical path of a 1*N optical switch.

The signal light of the optical switch system in the embodiment may specifically be service light with an operating wavelength. A semi-transmissive semi-reflective module 4 may specifically be a reflector or a prism coated with a film matching an operating light wavelength, is specifically configured to vertically transform an optical path of a service light passing through the input fiber 1 and the micro-lens array 31, as shown in the drawing, to transform the optical path of the input service light by 90 degrees to reflect the service light to the main lens 32; and is further configured to vertically transform an optical path of the light which takes a first proportion in the service light reflected by the micro electro mechanical systems reflector 33 and the main lens 32, as shown in the drawing, to transform the service light output by the main lens by 90 degrees to reflect the light which takes a first proportion in the output service light to the output fiber 2, and transmit the light which takes a second proportion in the service light to an imaging module 5. A sum of the first proportion and the second proportion is 1, and the first proportion is far larger than the second proportion. In general, the first proportion and the second proportion may be set as 95% and 5%, respectively, that is, most of the output service light is reflected to the output fiber 2 by the semi-transmissive semi-reflective module 4, and a small part of the light is transmitted, and then the light arrives at the imaging module 5. The test light in the embodiment described above is specifically the light which takes the second proportion in the service light. In the embodiment, when an optical switch is working, after being reflected by the specific reflecting film coated on the semi-transmissive semi-reflective module 4, a small part of the service light is transmitted to the imaging module 5, and most of the light is output from the output fiber 2. After the small part of the service light transmitted by the reflecting film arrives at the imaging module 5, the imaging module 5 detects the service light that is input into the imaging module, and generates sampled optical path information, which, herein, may specifically be: acquiring flare information, and sending initial flare recorded by a storage module and detected flare information to a judging module 6. The judging module 6 compares the initial flare with the detected flare, and determines whether the two match, such as determining whether positions and sizes of the two are consistent with each other. A control module 7 is configured to control the rotation angle of the MEMS reflector according to a comparison result generated by the judging module 6, and finally determine an optimal optical path of an optical switch until the detected flare matches the initial flare.

The embodiment provides an optical switch system that is specifically applied to the MEMS optical switch, the semi-transmissive semi-reflective module and the imaging module are set, the semi-transmissive semi-reflective module transmits a small part of the signal light to the imaging module, so as to implement feedback control on the signal light output by the optical switch system, and the optical output control module of the optical switch system is adjusted and controlled according to a feedback result, to determine an optimal optical path of an optical switch. With the embodiment, precise positioning of the whole optical path in an optical switch can be implemented, and as compared with the prior art, a cost is greatly reduced and the effect on optical performance of the optical switch system caused by the feedback control is reduced.

Figure 4:
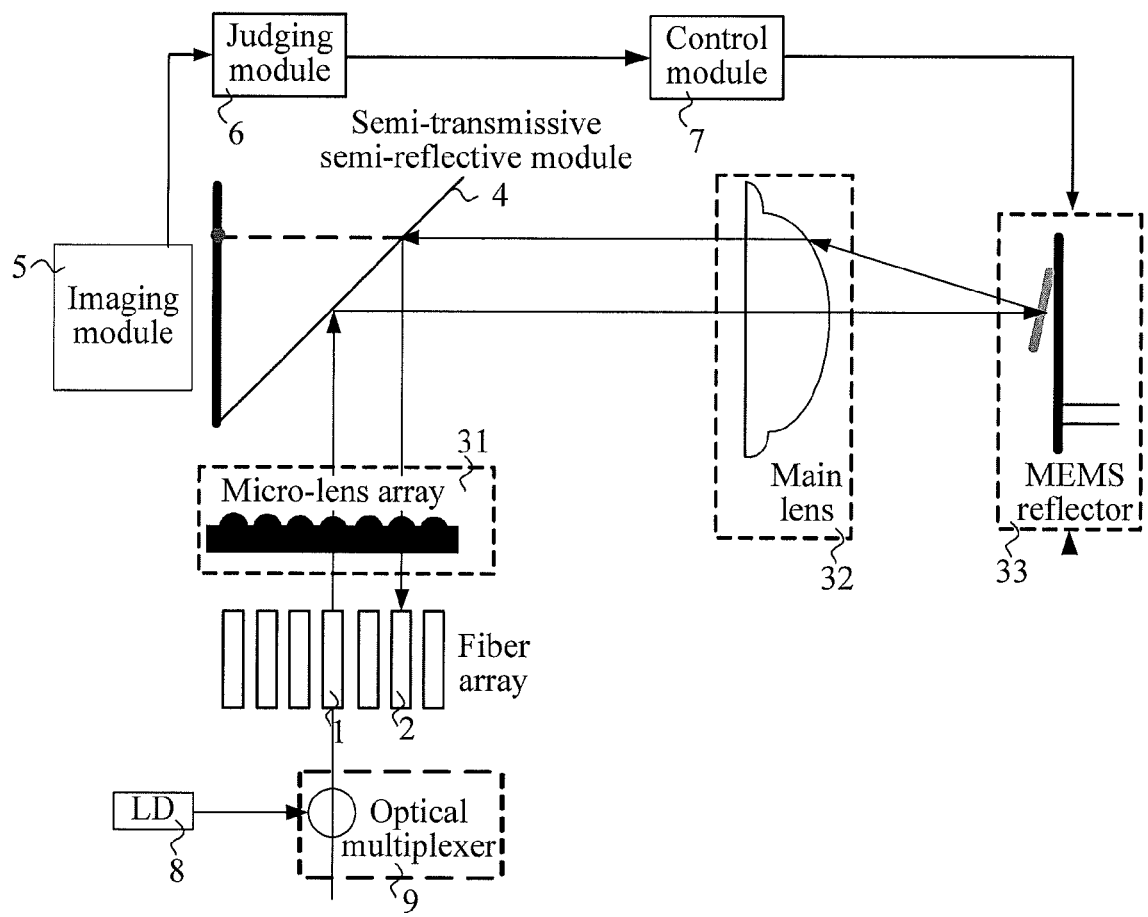
FIG. 4 is a schematic working principle diagram of an optical switch in Embodiment 3 of the optical switch system of the present invention.

FIG. 4 is a schematic working principle diagram of an optical switch in Embodiment 3 of an optical switch system of the present invention. As shown in FIG. 4, this embodiment provides an optical switch system. Compared with the embodiment shown in FIG. 3, the optical switch system in this embodiment may include an internal laser source (Laser Source, called LD for short below) 8 and an optical multiplexer 9, the LD 8 is configured to output laser light, and the optical multiplexer 9 is configured to input the laser light output by the LD 8 into an input fiber. In general, the optical multiplexer 9 may be a wavelength division multiplexing (Wavelength Division Multiplexing, called WDM for short below) with three ports, or may be another passive optical device, such as a circulator. Signal light of the optical switch system in the embodiment may include laser light and service light, the laser light has a non-operating wavelength and is used to test the optical switch system, where the test light in the embodiment described above is specifically the laser light herein, a semi-transmissive semi-reflective module 4 is coated with a reflecting film matching the non-operating wavelength of the laser light and specifically transmits all of the laser light to an imaging module 5, and reflects all of the service light to an output fiber 2.

Specifically, the semi-transmissive semi-reflective module 4 in the embodiment is specifically configured to vertically transform optical paths of the service light and the laser light which pass through the input fiber 1 and a micro-lens array 31, transform both of the optical paths of the two by 90 degrees to reflect both the service light and the laser light to a main lens 32, and is further configured to vertically transform the optical path of the service light reflected by a micro electro mechanical systems reflector 33 and the main lens 32, so as to reflect all of the service light to the output fiber 2, and is configured to transmit the laser light reflected by the micro electro mechanical systems reflector 33 and the main lens 32 to an imaging module 5. The imaging module 5 detects the laser light, so that the service light is not affected.

In the embodiment, when an optical switch is powered on and starts to work, the LD 8 outputs the laser light, the laser light is input into the input fiber 1 together with the service light by the optical multiplexer 9, and is emitted onto the reflector after being processed by the micro-lens, which is corresponding to a fiber channel of the input fiber 1, in the micro-lens array 31; after being reflected by the reflector, the laser light and the service light are vertically transformed and arrive at the main lens 32 and are emitted onto the MEMS reflector 33 after being processed by the main lens 32, and the MEMS reflector 33 sets a deflection angle thereof according to initial. The laser light and the service light are emitted onto the reflector through the main lens 32 after being reflected by the MEMS reflector 33; the reflector reflects all of the service light to the output fiber 2 and transmits all of the laser light to the imaging module 5. The imaging module 5 generates, according to the acquired laser light, sampled optical path information which specifically is detected flare. Recorded initial flare and the detected flare are sent to a judging module 6. The judging module 6 compares the initial flare with the detected flare, determines whether the deflection angle of the MEMS reflector needs to be corrected. When the detected flare does not match the initial flare and an error is large, it indicates that the deflection angle needs to be corrected; otherwise, it indicates that the optical switch is in a stable working state and the rotation angle of the MEMS does not need to be adjusted. The judging module 6 may specifically generate, according to the process of comparison, a comparison result. The comparison result is the error between the detected flare and the initial flare. The comparison result is sent to a control module 7. The control module 7 controls the deflection of the MEMS reflector 33 according to the comparison result. The foregoing process is further repeated to acquire a comparison result after deflection, and when the detected flare matches the initial flare, it is finally determined that the optical path of the optical switch at this time is optimal.

The embodiment provides an optical switch system, the semi-transmissive semi-reflective module and the imaging module are set, the semi-transmissive semi-reflective module transmits a small part of the signal light to the imaging module, so as to implement feedback control on the signal light output by the optical switch system, and the optical output control module of the optical switch system is adjusted and controlled according to a feedback result, to determine an optimal optical path of an optical switch. With the embodiment, precise positioning of the whole optical path in an optical switch can be implemented, and as compared with the prior art, a cost is greatly reduced and the effect on optical performance of the optical switch system caused by the feedback control is reduced.

Figure 5:
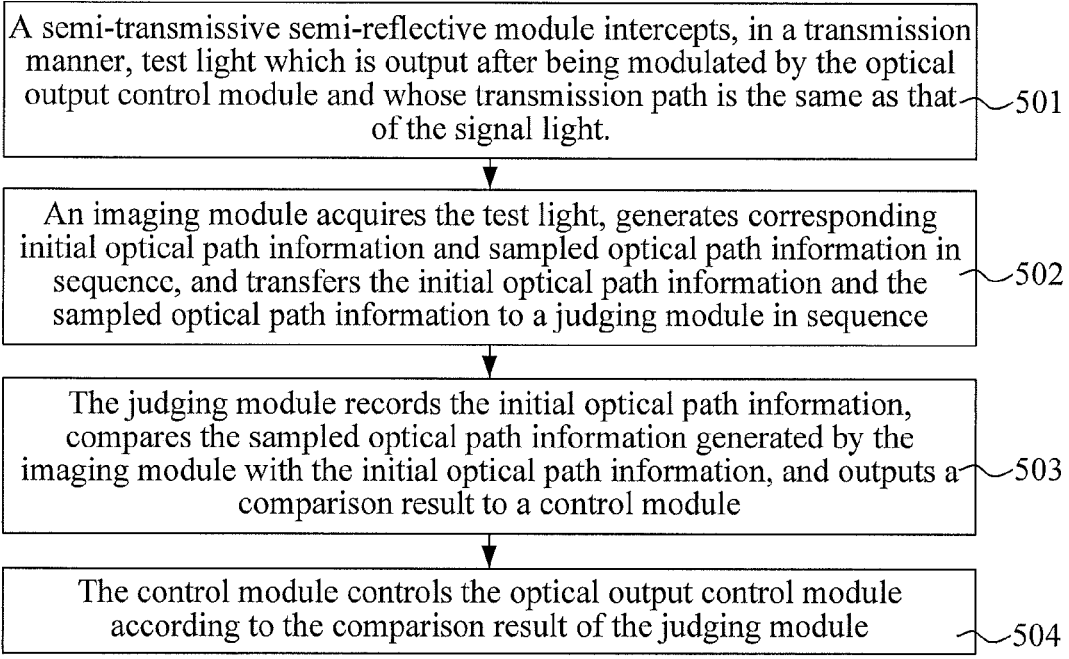
FIG. 5 is a flow chart of an embodiment of a feedback control method of signal light of the present invention.

FIG. 5 is a flow chart of an embodiment of a feedback control method of signal light of the present invention. As shown in FIG. 5, the embodiment provides a feedback control method of signal light, and the method is applied to the optical switch system, which is shown in FIG. 2 to FIG. 4 and details are not described herein. It can be learned from the foregoing embodiments that, the optical switch system includes an input fiber, an output fiber, an optical output control module, a semi-transmissive semi-reflective module, an imaging module, a judging module and a control module, and signal light is emitted out from the input fiber, modulated by the optical output control module and emitted into the output fiber. The feedback control method of signal light in the embodiment may specifically include the following steps:

Step 501: The semi-transmissive semi-reflective module intercepts, in a transmission manner, test light which is output after being modulated by the optical output control module and whose transmission path is the same as that of the signal light.

Step 502: The imaging module acquires the test light, generates corresponding initial optical path information and sampled optical path information in sequence, and transfers the initial optical path information and the sampled optical path information to the judging module in sequence.

Step 503: The judging module records the initial optical path information, compares the sampled optical path information generated by the imaging module with the initial optical path information, and outputs a comparison result to the control module.

Step 504: The control module controls the optical output control module according to the comparison result of the judging module.

The embodiment provides a feedback control method of signal light, the semi-transmissive semi-reflective module and the imaging module are set, the semi-transmissive semi-reflective module transmits a small part of the signal light to the imaging module, and the imaging module sends detected sampled optical path information and the initial optical path information to the judging module. After the judging module compares the sampled optical path information with the initial optical path information, the control module performs corresponding control on the optical output module according to a comparison result, so as to implement the feedback control on the signal light output by the optical switch system, and the optical output control module of the optical switch system is adjusted and controlled according to a feedback result, to determine an optimal optical path of an optical switch. With the embodiment, precise positioning of the whole optical path in an optical switch with a large branching ratio can be implemented, and as compared with the prior art, a cost is greatly reduced and the effect on optical performance of the optical switch system caused by the feedback control is reduced.

Persons of ordinary skill in the art should understand that all or a part of the steps of the methods in the embodiments may be implemented by a program instructing relevant hardware. The program may be stored in a computer readable storage medium. When the program runs, the steps of the methods in the embodiments are performed. The storage medium may be any medium that is capable of storing program codes, such as a ROM, a RAM, a magnetic disk, or an optical disk.

Finally, it should be noted that the above embodiments are merely intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof, and such modifications or substitutions cannot make the essence of the corresponding technical solutions depart from the idea and scope of the technical solutions of the embodiments of the present invention.

What is claimed is:

1. An optical switch system, comprising:
    an input fiber, an output fiber, an optical output control module, a semi-transmissive semi-reflective module, an imaging module, a judging module and a control module;
    wherein a signal light is emitted from the input fiber, modulated by the optical output control module and emitted into the output fiber;
    wherein the optical output control module comprises a micro-lens array, a main lens and a micro electro mechanical systems reflector, the signal light is reflected to the main lens by the semi-transmissive semi-reflective module after being transmitted by the micro-lens array, the signal light is returned to the main lens after being reflected by the micro electro mechanical systems reflector;
    the semi-transmissive semi-reflective module is configured to intercept a test light which is output after being modulated by the optical output control module in a transmission path of the signal light;
    the imaging module is configured to acquire the test light, generate corresponding initial optical path information and sampled optical path information in sequence, and transfer the initial optical path information and the sampled optical path information to the judging module in sequence;
    the judging module is configured to compare the sampled optical path information generated by the imaging module with the initial optical path information, and output a comparison result to the control module;
    the control module is configured to control a rotation angle of the micro electro mechanical systems reflector according to the comparison result of the judging module, so as to determine an optimal optical path of an optical switch.

2. The optical switch system according to claim 1, wherein the input fiber and output fiber are in arrayed arrangement and the input fiber is at a middle of an array, and multiple output fibers are distributed at a periphery of the input fiber.

3. The optical switch system according to claim 2, wherein the semi-transmissive semi-reflective module is at an optical input end of the input fiber, and the signal light modulated by the optical output control module is reflected to an optical input end of the output fiber through the semi-transmissive semi-reflective module.

4. The optical switch system according to claim 3, wherein the signal light is reflected to the optical output control module by the semi-transmissive semi-reflective module after being output from the input fiber.

5. The optical switch system according to claim 1, wherein the signal light is a service light with an operating wavelength, and the semi-transmissive semi-reflective module is an optical lens coated with a film matching the operating wavelength, and
    the semi-transmissive semi-reflective module is configured to:
        vertically transform an optical path of the service light passing through the input fiber and the micro-lens array, so as to reflect the service light to the main lens,
        vertically transform an optical path of a light which takes a first proportion in the service light reflected by the micro electro mechanical systems reflector and the main lens, so as to reflect the light which takes the first proportion in the service light to the output fiber, and
        transmit a light which takes a second proportion in the service light to the imaging module;
    wherein a sum of the first proportion and the second proportion is 1, the first proportion is larger than the second proportion, and the test light is the second proportion in the service light.

6. The optical switch system according to claim 1, wherein the signal light comprises a laser light with a non-operating wavelength and a service light with an operating wavelength, and the test light is the laser light;
    the optical switch system further comprises an internal laser source and an optical multiplexer, the internal laser source is configured to output the laser light, and the optical multiplexer is configured to input the laser light into the input fiber; and
    the semi-transmissive semi-reflective module is a reflector coated with a reflecting film matching the non-operating wavelength, and
    the semi-transmissive semi-reflective module is configured to:
        vertically transform the optical paths of the service light and the laser light which pass through the input fiber and the micro-lens array, so as to reflect the service light and the laser light to the main lens, and
        vertically transform an optical path of the service light reflected by the micro electro mechanical systems reflector and the main lens, so as to reflect the service light to the output fiber, and
        transmit the laser light reflected by the micro electro mechanical systems reflector and the main lens to the imaging module.

7. A feedback control method of signal light, applied to an optical switch system, wherein the optical switch system comprises an input fiber, an output fiber, an optical output control module, a semi-transmissive semi-reflective module, an imaging module, a judging module and a control module, a signal light is emitted from the input fiber, modulated by the optical output control module and emitted into the output fiber, and the method comprises:
    intercepting, by the semi-transmissive semi-reflective module, a test light output after being modulated by the optical output control module in a transmission path of the signal light;
    acquiring, by the imaging module, the test light, generating corresponding initial optical path information and sampled optical path information in sequence, and transferring the initial optical path information and the sampled optical path information to the judging module in sequence;
    recording, by the judging module, the initial optical path information, comparing the sampled optical path information generated by the imaging module with the initial optical path information, and outputting a comparison result to the control module; and controlling, by the control module, the optical output control module according to the comparison result of the judging module;

wherein the optical output control module comprises a micro-lens array, a main lens and a micro electro mechanical systems reflector, and the method further comprises:

reflecting, by the semi-transmissive semi-reflective module, the signal light to the main lens;

returning, by the main lens, the signal light reflected by the micro electro mechanical systems reflector; and controlling, by the control module, a rotation angle of the micro electro mechanical systems reflector according to the comparison result of the judging module, so as to determine an optimal optical path of an optical switch.

8. The feedback control method according to claim 7, wherein an output reflection angle of the optical output control module is adjusted to maintain a value of the comparison result within a range, and an optical path is determined as the optimal optical path when detecting the value.

* * * * *